Patented Dec. 12, 1922.

1,438,375

UNITED STATES PATENT OFFICE.

THOMAS REGINALD HANCOCK AND LESLIE JOHN HANCOCK, OF LONDON, ENGLAND.

CUTTING TOOL.

No Drawing.   Application filed November 25, 1921.   Serial No. 517,821.

*To all whom it may concern:*

Be it known that we, THOMAS REGINALD HANCOCK and LESLIE JOHN HANCOCK, both of 224 Upper Thames Street, London, E. C. 4, England, British subjects, have invented certain new and useful Improvements in Cutting Tools, of which the following is a specification.

This invention relates to the deposition of high speed metals on the tips of cutting tools and on the surfaces of other articles subject to great wear or heat.

The object of the present invention is to provide improved means for uniting firmly a tip or edge of high speed steel or like metal or alloy with a tool or other body of inferior steel and in particular to enable a tool or other body to be tipped or edged with a metal known as "Stellite," and for convenience the high speed steel or like metal or alloy of which the tip or edge is constituted will be hereinafter referred to as high speed metal.

According to the present invention the high speed metal is cast on to the appropriate surface of the tool or other body after said surface has been prepared by amalgamating therewith, copper or low fusion cast-iron such as that which is employed for welding purposes.

In accordance with one form of the invention the tool-body is formed with a ledge for the reception of the high speed metal and is placed in a suitable mould of electrolytic graphite, graphite, carbon or moulder's sand. Copper or cast-iron is then laid on the surface of the ledge or deposited on said surface by running on with a blow-pipe and is amalgamated with said surface by heating the tool-body so as to form on said tool body a layer about one-thousandth of an inch thick of an amalgam having a fusion point slightly lower than that of the tool body. The tool-body with its mould is then introduced into a suitable high temperature furnace so as to raise its temperature to the melting point of the amalgam and high speed metal is cast on said ledge to the shape of the mould either by pouring molten high speed metal from a crucible or by placing a piece of high speed metal on the ledge and allowing it to melt thereon. The tool is then cooled off and may be ground to shape in the usual manner.

The layer of amalgam serves to protect the surface of the ledge from oxidation in the furnace, and, since both the high speed metal and the amalgam having lower melting points and are of less volume than the tool body, they will melt before the tool body.

Also since the amalgam is inert in respect of the high speed metal, the amalgamated surface prevents contamination of the high speed metal by the inferior metal of the tool body and it is thus possible to provide a tool or other body with a tip or edge of high speed metal without danger of affecting the valuable properties of that metal.

It will be seen that, by means of a process such as described above, any fittings or tools such as composite tools, engine valves vise jaws, dies, rollers, gudgeon pins, bearings and the like, which are subject to great wear or heat, may be provided with working surfaces of high speed metal.

We claim:—

1. The improved process for forming a cutting tool provided with a tip or edge of stellite united with a body of inferior metal, which consists in amalgamating copper or low-fusion cast-iron with a surface of said body, and casting stellite on said amalgamated surface, the relative melting points being such that the tool body has a higher melting point and the copper or cast-iron a lower melting point than the stellite.

2. The improved process for forming a cutting tool provided with a tip or edge of stellite united with a body of inferior metal, which consists in depositing copper or low-fusion cast-iron on a surface of said body, placing said body in a mould, heating said body until said copper or cast iron amalgamates with said surface and pouring molten stellite into said mould and on to said amalgamated surface, the relative melting points being such that the tool body has a higher melting point and the copper or cast iron a lower melting point than the stellite.

3. The improved process of uniting a tip or edge of high speed metal with a body of inferior metal, which consists in depositing copper or low fusion cast-iron on a surface of said body, placing said body in a mould, heating said body until said copper or cast iron amalgamates with said surface, placing a piece of high speed metal in said mould and heating said body, said mould and said high speed metal until said high speed metal melts and unites with said surface.

THOMAS REGINALD HANCOCK.
LESLIE JOHN HANCOCK.